(12) United States Patent
Gliozzo et al.

(10) Patent No.: US 10,699,069 B2
(45) Date of Patent: Jun. 30, 2020

(54) POPULATING SPREADSHEETS USING RELATIONAL INFORMATION FROM DOCUMENTS

(71) Applicant: International Business Machines Corporation, Armonk, NY (US)

(72) Inventors: Alfio Massimiliano Gliozzo, New York, NY (US); Aaron Chavez, Denver, CO (US); Robert G. Farrell, Yorktown Heights, NY (US); Gaetano Rossiello, New York, NY (US); Nicolas Rodolfo Fauceglia, Yorktown Heights, NY (US); Mudita Singhal, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 16/157,382

(22) Filed: Oct. 11, 2018

(65) Prior Publication Data

US 2020/0117708 A1 Apr. 16, 2020

(51) Int. Cl.
*G06F 17/00* (2019.01)
*G06F 40/18* (2020.01)

(52) U.S. Cl.
CPC .................................. *G06F 40/18* (2020.01)

(58) Field of Classification Search
CPC ..................................................... G06F 40/18
See application file for complete search history.

(56) References Cited

U.S. PATENT DOCUMENTS

| | | | | |
|---|---|---|---|---|
| 6,002,865 A * | 12/1999 | Thomsen | ................ | G06F 40/18 |
| 6,629,097 B1 * | 9/2003 | Keith | ................. | G06F 16/9558 |
| 7,912,701 B1 * | 3/2011 | Gray | ...................... | G06F 40/20 704/9 |
| 8,239,750 B2 * | 8/2012 | Thomsen | ................ | G06F 40/18 715/212 |
| 8,434,027 B2 * | 4/2013 | Jones | .................... | G06F 16/904 715/848 |
| 8,601,361 B2 | 12/2013 | Berger et al. | | |
| 8,799,234 B2 * | 8/2014 | Gulwani | ................. | G06F 40/16 707/687 |
| 8,990,140 B2 * | 3/2015 | Michelstein | ......... | G06F 40/131 706/47 |

(Continued)

OTHER PUBLICATIONS

Mel, et al. "The NIST Definition of Cloud Computing". Recommedations of the National Institute of Standards and Technology. Nov. 16, 2015.

*Primary Examiner* — Laurie A Ries
(74) *Attorney, Agent, or Firm* — Anthony R. Curro, Esq.; McGinn IP Law Group, PLLC

(57) ABSTRACT

A spreadsheet population method, system, and computer program product include associating text with a spreadsheet, the text including candidate data items for populating the spreadsheet, building a multi-dimensional analogy model where each dimension comprises a unique pair of data items where the data items co-occur within a same context window, accepting example data items in the spreadsheet where the data items form tuples in a same implicit relationship according to a spatial configuration, and performing an assistance operation on the spreadsheet using the data item tuples retrieved using the analogy model from the example data items.

20 Claims, 8 Drawing Sheets

(56) References Cited

U.S. PATENT DOCUMENTS

| | | | |
|---|---|---|---|
| 9,158,744 B2* | 10/2015 | Rao | G06F 40/117 |
| 9,384,322 B2* | 7/2016 | Sasidhar | G06F 16/258 |
| 10,540,446 B2* | 1/2020 | DeFelice | G06N 3/0472 |
| 2004/0015783 A1* | 1/2004 | Lennon | G06F 16/258 |
| | | | 715/235 |
| 2005/0197784 A1* | 9/2005 | Kincaid | G06F 16/21 |
| | | | 702/19 |
| 2007/0112714 A1* | 5/2007 | Fairweather | G06K 13/0825 |
| | | | 706/46 |
| 2009/0006156 A1* | 1/2009 | Hunt | G06Q 10/063 |
| | | | 705/7.11 |
| 2009/0018996 A1* | 1/2009 | Hunt | G06F 16/283 |
| 2009/0044095 A1* | 2/2009 | Berger | G06F 16/258 |
| | | | 715/226 |
| 2010/0321407 A1* | 12/2010 | Mital | G06T 11/206 |
| | | | 345/643 |
| 2015/0127650 A1* | 5/2015 | Carlsson | G06F 16/3334 |
| | | | 707/737 |
| 2018/0204111 A1* | 7/2018 | Zadeh | G06N 3/0436 |
| 2018/0329982 A1* | 11/2018 | Patel | G06F 40/35 |
| 2019/0147031 A1* | 5/2019 | Dvorak | G06F 40/18 |
| | | | 715/219 |

* cited by examiner

FIG. 2A

| A | B |
|---|---|
| Victor Weisskopf | Murray Gell-Mann |
| John Bardeen | Nick Holonyak jr. |

FIG. 2B

| A | B |
|---|---|
| Victor Weisskopf | Murray Gell-Mann |
| John Bardeen | Nick Holonyak jr. |
|  |  |

FIG. 2C

| A | B |
|---|---|
| Victor Weisskopf | Murray Gell-Mann |
| John Bardeen | Nick Holonyak jr. |
| Alfred Kleiner | Albert Einstein |

| A | B |
|---|---|
| Victor Weisskopf | Murray Gell-Mann |
| John Bardeen | Nick Holonyak jr. |
| Alfred Kleiner | |

| Victor Weisskopf | Murray Gell-Mann |
|---|---|
| John Bardeen | Nick Holonyak jr. |
| Alfred Kleiner | Albert Einstein |

US 10,699,069 B2

POPULATING SPREADSHEETS USING RELATIONAL INFORMATION FROM DOCUMENTS

BACKGROUND

The present invention relates generally to a spreadsheet population method, and more particularly, but not by way of limitation, to a system, method, and computer program product for building a representation of a corpus that can be used to populate a spreadsheet.

Spreadsheets are used throughout the business world for interactive tabular data entry. Conventionally, business users manually often extract information from documents, such as news articles, technical reports, social media posts, and regulations, to populate their spreadsheets. Populating a spreadsheet in this way can be a time consuming task and require additional human resources that increases the cost for a business.

The conventional techniques require manual work to extract and place data in cells that conform to the user's semantics for the columns, rows, and relationships between cells.

For example, one conventional technique is purported to recognize cells that are in a pre-determined category (e.g., city, state, country, and zip code) and uses that category to determine additional types of information (e.g., demographics, population) that is then available for each cell. However, this conventional technique requires a set template with repeated values and does not work with example relationships between cells.

Therefore, a method is needed that populates spreadsheet data using examples of implicit relationships and suggests data from the document corpus that may conform to these implicit relationships.

SUMMARY

In an exemplary embodiment, the present invention provides associating text with a spreadsheet, the text including candidate data items for populating the spreadsheet, building a multi-dimensional analogy model where each dimension comprises a unique pair of data items where the data items co-occur within a same context window, accepting example data items in the spreadsheet where the data items form tuples in a same implicit relationship according to a spatial configuration, and performing an assistance operation on the spreadsheet using the data item tuples retrieved using the analogy model from the example data. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIGS. 2A-2C exemplarily depict obtaining similar tuples according to an embodiment of the present invention;

DETAILED DESCRIPTION

Figure 1:
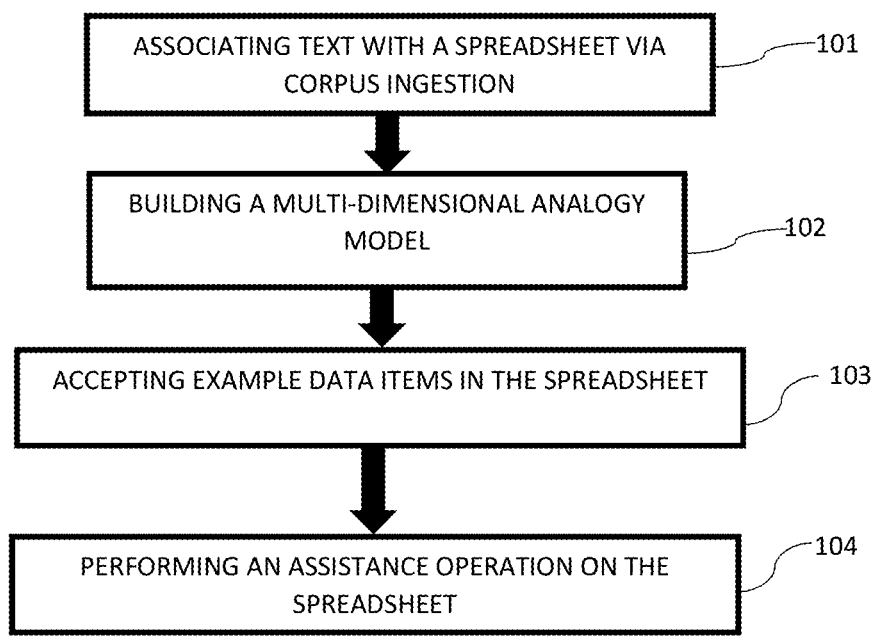
FIG. 1 exemplarily shows a high-level flow chart for a spreadsheet population method 100 according to an embodiment of the present invention.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a spreadsheet population method 100 according to the present invention can include various steps for performing an assistance operation on the spreadsheet based on analogy.

Thus, in the invention, spreadsheet data can be used as examples of implicit relationships and data from the document corpus can be suggested that conform to these implicit relationships. Hence, by providing relationship examples, the spreadsheet can be subsequently populated.

Figure 6:
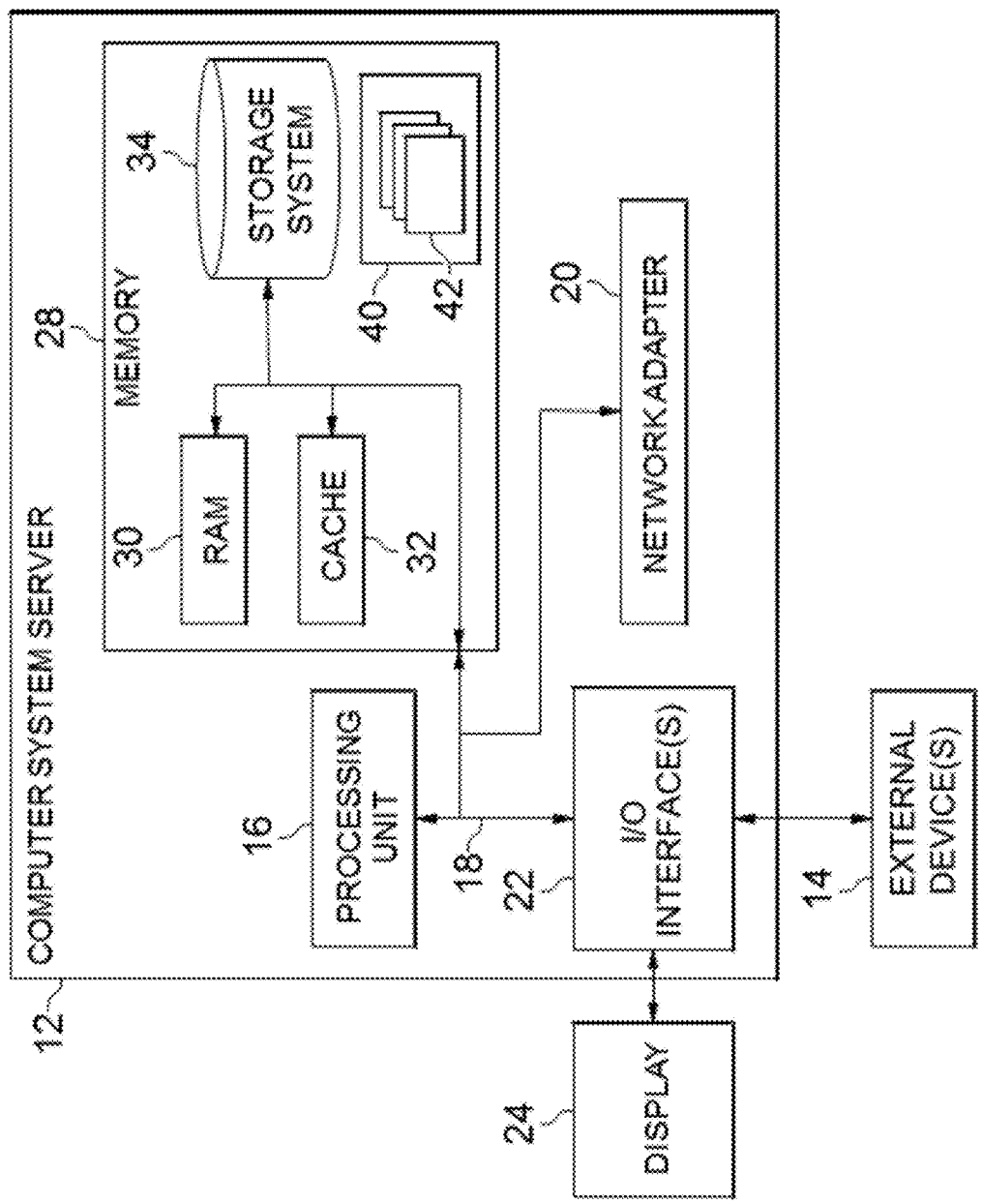
FIG. 6 depicts a cloud-computing node 10 according to an embodiment of the present invention.

By way of introduction of the example depicted in FIG. 6, one or more computers of a computer system 12 according to an embodiment of the present invention can include a memory 28 having instructions stored in a storage system to perform the steps of FIG. 1.

Although one or more embodiments may be implemented in a cloud environment 50 (see e.g., FIG. 8), it is nonetheless understood that the present invention can be implemented outside of the cloud environment.

Referring to FIG. 1, steps 101-104 can assist a user in populating a spreadsheet with data items from text of a corpus through analogy.

More specifically, in step 101, text is associated (e.g., loading from the application, putting in a configuration file, querying, pre-building with the application) with a spreadsheet. The text includes candidate data items for populating the spreadsheet.

For example, the text can be associated with a spreadsheet via corpus ingestion which can split the textual corpus into context windows (CWs) (e.g., sentences, paragraphs, etc.), extract pairs of text units ("TU") as examples (noun phrases, named entities, etc.) from each extracted CW, and create an inverted index to a set of CWs for each TU pair (e.g., implicit relationships).

In step 102, a multi-dimensional analogy model is built where each dimension is, for example, a unique pair of data items where the data items co-occur within a same context window in the corpus. The context window(s) are configured for the spreadsheet to include the text context needed to capture implicit relationships between the candidate data items in a given spatial configuration (e.g., same row, col) in the spreadsheet. Context window(s) can be, for example, sections, paragraphs, sentences, captions, or other regular portions of text. Thus, the invention typically begins without any named or stated relationships, but instead the invention captures implicit relationships.

The multi-dimensional analogy model includes a model where the vectors include pairs of text units. Latent Semantic Analysis (LSA), Singular Value Decomposition (SVD), and skipgram and other techniques may be used to produce a reduced dimensionality analogy model. For example, a 100 to 300 dimensional space may be generated.

That is, the pairs of text units are analyzed to capture implicit relationships. For example, as depicted in FIGS. 2A-2C, plain text is analyzed from the corpus to capture implicit relationships between the pair "Victor Weisskopf" and "Murray Gell-Mann" and the pair "John Bardeen" and "Nick Holonyak Jr.". The multi-dimensional analogy model captures an implicit relationship between "Victor Weisskopf" and "Murray Gell-Mann" and then attempts to find if "John Bardeen" and "Nick Holonyak Jr." are related based on the same implicit relationship. Then, the model proceeds to retrieve data pairs that have a similar implicit relationship (i.e., other pairs of scientists and their students). Thus, when a user in step 103 enters "Victor Weisskopf" and "Murray Gell-Mann" and "John Bardeen" and "Nick Holonyak Jr." in a spreadsheet having the depicted spatial configuration of FIG. 2A, the implicit relationship is inferred between the pairs and then other pairs of data points with a similar relationship can be retrieved and filled in. Thus, the user can select a 4×4 cell matrix (e.g., as depicted in FIG. 2B) including "Victor Weisskopf" and "Murray Gell-Mann" and "John Bardeen" and "Nick Holonyak Jr." to cause the user assistance in step 104 to fill in the rest of the cells with values that have the same implicit relationship between them (i.e. additional pairs of scientists and their students). Specifically, the user selects N=1 row(s) in FIG. 2B to fill and the system fills in the row according to the analogy with the first two rows automatically.

In other words, the user is selecting examples in FIG. 2B (e.g., in this case, the first two rows), selecting blank rows (e.g., in this case, the third row), and then in FIG. 2C it fills in the blank rows with the pairs in the most similar implicit relationship.

It is noted that the context windows in the corpus include "Murray Gell-Mann, one of the principal discoverers of the quarks, is one of the distinguished pupils of Victor Weisskopf" and "Professor Nick Holonyak jr. was the first phd student of Nobel Prize winner John Bardeen". Thus, through the association of text via corpus ingestion, the context window text can be used to produce the multi-dimensional analogy model and the cells are able to be filled.

It is noted that the above example is given from a spatial configuration of elements in a row related to each other. But, a configuration with only one column can be utilized where the implicit relationship is based on one entity in a column to another entity. The user may select any number of rows to populate.

In building the multi-dimensional analogy model, the multi-dimensional analogy model relies on a Latent Relational Model (LRM) which provides an intentional representation of relations by embedding the implicit properties observed in text about how two entities are related. Given a textual corpus T, the aim is to build a vocabulary V, composed of the unique entity pairs extracted from T, and a lookup table $M^{n,k}$, with n=|V|, consisting of k-dimensional latent relational vectors associated to each element of V. Thus, vectors may be generated for the pairs.

For an entity pair vocabulary, given a textual corpus T, a vocabulary V={$(X_1, Y_1), \ldots, (X_n, Y_n)$} is built, where ($X_i$, $Y_i$) are distinct entity pairs that occur together at least in one sentence. The entities are extracted through a Noun Phrase (NP) chnker (a shallow parser using part-of-speech tags but not parse structure) or a Named Entity Recognizer (NER) that also identifies a type for the entities (person, place, location, etc.) 1.

The next step in building the model is to extract the contexts around each entity pair when they co-occur in sentences across the corpus T. The invention adopts a set of lexical and syntactical features extracted from each sentence. Given an entity pair, from each sentence in which the pair occurs, the method extracts: (1) the entity types provided by the NER, if available; (2) the sequence of words between the two entities; (3a) the part-of-speech tags of these words; (3b) a flag indicating which entity came first; (4) an n-gram to the left of the first entity, (5) an n-gram to the right of the second entity, and (6) a dependency path between the two entities. Other linguistic features could be extracted and used in the model. If an entity pair occur in more than one sentence, the features extracted from each sentence are collected into a single "bag". In other words, the invention builds the model by looking to a certain number of sentences surrounding the sentence with the words to infer an implicit relationship.

Then, a sparse matrix $X^{n,m}$ is built by mapping the n entity pairs in V to the rows and the m distinct features/contexts extracted in the previous step to the columns. Each element $X^{i,j}$ represents the weight of the j-th context in relation to the i-th entity pair. This weight can be computed using different well-known weighing schemes, such as binary, tf-idf, entropy, etc. Since $X^{n,m}$ is a highly sparse matrix, this representation is not able to catch the implicit meaning across the textual contexts which express the same semantics. For instance, the phrases "A is the author of B" and "C wrote D" have the same meaning with respect to the relation authorOf, but the patterns "is the author of" and "wrote" are represented as separate features in X. As a consequence, the vectors related to the pairs (A,B) and (C,D) in X are orthogonal even if they convey the same concept. The invention can therefore, for example, apply Singular Value Decomposition (SVD) to the sparse matrix X in order to produce a low-rank approximation of $X \approx X_k = U_k \Sigma_k V_k^T$, where k is a hyper-parameter. The lookup table is obtained by $M^{n,k} = (U_k \Sigma_k)_{n,k}$. Each i-th row in M is a k-dimensional latent relational vector associated to each entity pair in V. SVD takes into account the global distribution of the pair contexts in the corpus in order to capture the implicit relations among them. This latent information is embedded into the k-dimensional dense vectors. On the other hand, V k,m contains the latent vectors of each m feature/context.

Thus, through LRM and the multi-dimensional model being built, each entity pair occurring in the corpus is projected into a relational vector space. Therefore it is possible to leverage its geometric interpretation to measure similarities between entity pairs. Thus, there is an analogy between two pairs of entities if their latent vectors are close in the relational vector space. This proximity can be measured using a metric, such as Euclidean distance. Hence, given r(A,B) and r(C,D) the relational vectors in M related to the entity pairs (A, B) and (C, D):A:B=C:D⇔dist($r_{(A,B)}$, $r_{(C,D)}$)<t(1); where t is a threshold that establishes the breadth of the analogy between the two pairs.

Therefore, in one example, to manually populate the relation "capital" in a spreadsheet, one would collect the analogous tuples, so that ITALY:ROME=FRANCE:PARIS and so on. The aim is to use the geometric interpretation of analogy in attempting to emulate this analogical process in identifying tuples in texts that share the same relations. Formally, given as input a textual corpus T and a semantic relation R, the problem is to extract all pairs of entities that have the relation R in the corpus. Therefore, the output is an extensional representation of the relation R by listing all entity pairs in the corpus that belong to R. The question is: how is R defined in T? Accordingly, MT is considered as the LRM built on the corpus T. Based on the geometric interpretation of analogy, one can define the relation R in an extensional way through the intentional vector representations in MT as follows: a semantic relation R is a region in a relational vector space MT that outlines the boundaries among those entity-pair vectors that are analogous to each other.

Accordingly, since computing the analogy, hence the similarity, of all possible combinations of entity pair vectors is infeasible, RE is reduced to an optimization problem in finding the boundaries of that region in MT. For instance, in a supervised setting, a Support Vector Machine (SVM) classifier trained on relational entity-pair vectors is able to find a separating hyperplane into the hyperspace defined by MT. Regions into the vector space $M_T$ are split by the analogous entity pair vectors for a specific relation. During the test phase, a new entity pair is projected into $M_T$ and the classifier predict at which region the new instance belong.

It is noted that steps 101 and 102 are "a back end" processing in which the corpus of data is ingested and then a model is built for steps 103 and 104 to include user interaction via the spreadsheet with the model.

In step 103, example data items are accepted in the spreadsheet where the data items form tuples in the same implicit relationship according to a spatial configuration (e.g., sample row). The accepting can be from user selection or a query against the spreadsheet. Data items can be individual or sequences of tokens, words, phrases, named entities, dictionary words, noun phrase chunks, or other syntactic and semantic units in the text. And, the data items can include multi-media such as images, video, etc.

In other words, in step 103, the user enters data into a spreadsheet to form the tuples of a specific spatial configuration (i.e., rows/column entries).

In step 104, an assistance operation is performed on the spreadsheet using the data item tuples retrieved using the analogy model from the example data. For example, the assistance operation can include an auto-completion function, entry, correction, removal, scoring, etc.

That is, given a set of new TU pairs (examples entered in Step 103), the assistance operation uses V to find the centroid C of the examples, ranks TUs by similarity to C (e.g., cosine distance), filters out original examples and by spreadsheet constraints (e.g., data types, language, etc., and then normalize best N to aggregate and fit to blank cells (e.g., populates other cells in the spreadsheet for the user).

Figures 3A, 3B:
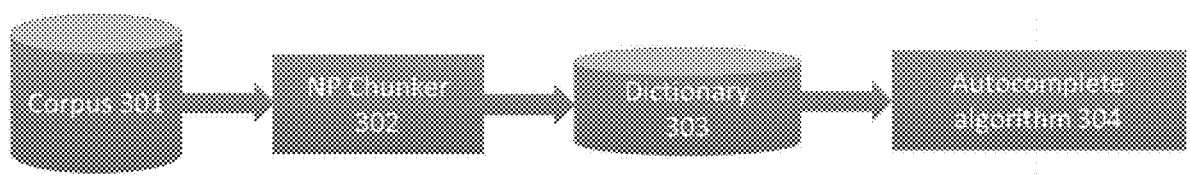
FIGS. 3A and 3B exemplarily depict an autocomplete function from corpus, according to an embodiment of the present invention.

For example, as depicted in FIGS. 3A-3B, the NP chunker 302 generates "Albert Einstein" and "Albert Niemann" and "Alfred Kleiner" from the Corpus 301 and the dictionary then includes "Einstein", and "Albert Einstein" ad "Niemann" and "Albert Niemann" and "Kleiner" and "Alfred Kleiner". When the user types "Albert" they get a list of "Albert Einstein", "Albert Neimann". If they type "Alfred" then the system autocompletes to "Alfred Kleiner".

Figures 4A, 4B:
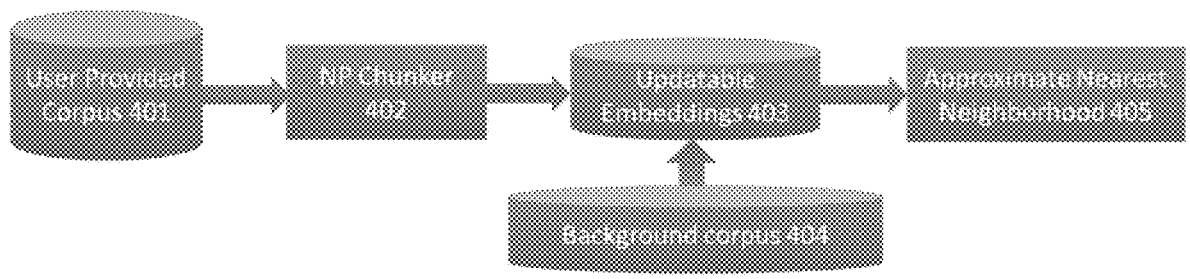
FIGS. 4A and 4B exemplarily depict entity expansion, according to an embodiment of the present invention.

As discussed above, the implicit relationship can be inferred (i.e., entity expansion) through a single column and not across a spatial configuration of a row. As depicted in FIGS. 4A-4B, the system will suggest one or more entities. In this case, it just suggests one cell, "Alfred Kleiner". For example, updatable embeddings 403 can be updated from a background corpus 404 in order to approximate nearest neighborhood 405 (e.g., in the same row or column without a reference to another row or column).

Figures 5A, 5B:
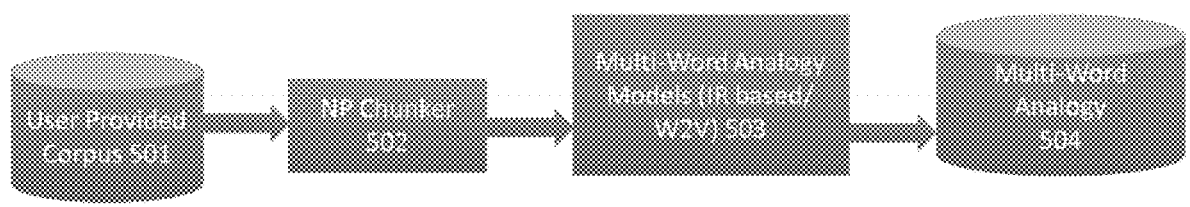
FIGS. 5A and 5B exemplarily depict relation expansion, according to an embodiment of the present invention.

Moreover, another assistance operation is exemplary depicted in FIGS. 5A-5B. For example, possible cell values can be automatically suggested in step 104 based on semantic understanding of analogy between pairs of entities. For example, a multi-word analogy model 503 can be used in order to perform multi-word analogy 504 in order to suggest the value for a spreadsheet. It should be noted that using 504, the system can sort the matching list of auto completions when entering data in in Column B according to the analogy score so that if the user types "Albert" in Column B then "Albert Einstein" comes up first instead of Albert Neimann, since Albert Einstein was a student of Alfred Kleiner's. That is, the system uses the latent relational model to find the pairs, including "Alfred Kleiner/Albert Einstein' then given the user types in the value of 'Alfred Kleiner' in Column A, the system can retrieve the related Column B and suggest 'Albert Einstein' because row 1 and row 2 are also examples of scientists and their students.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 6, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
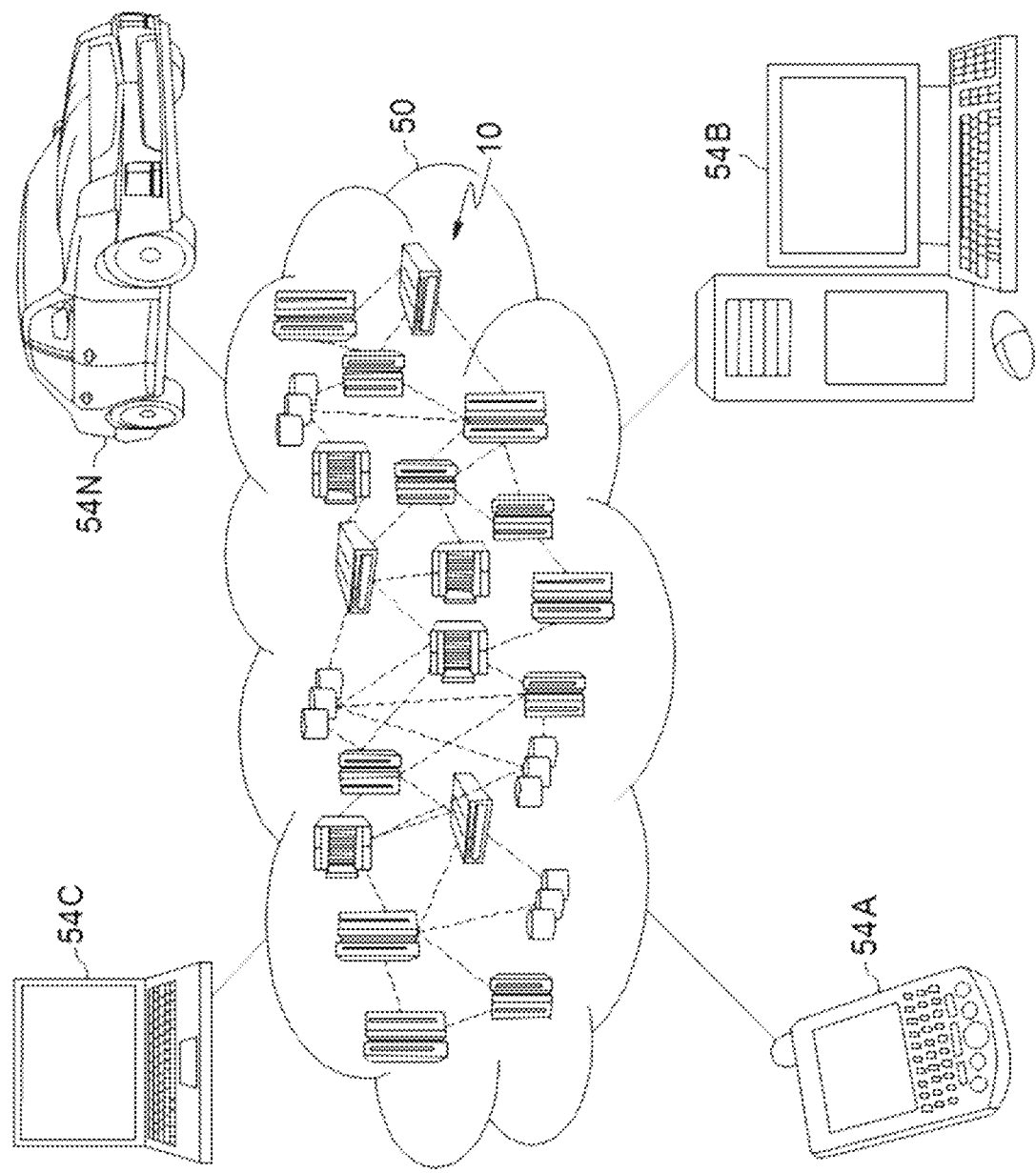
FIG. 7 depicts a cloud-computing environment 50 according to an embodiment of the present invention.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Figure 8:
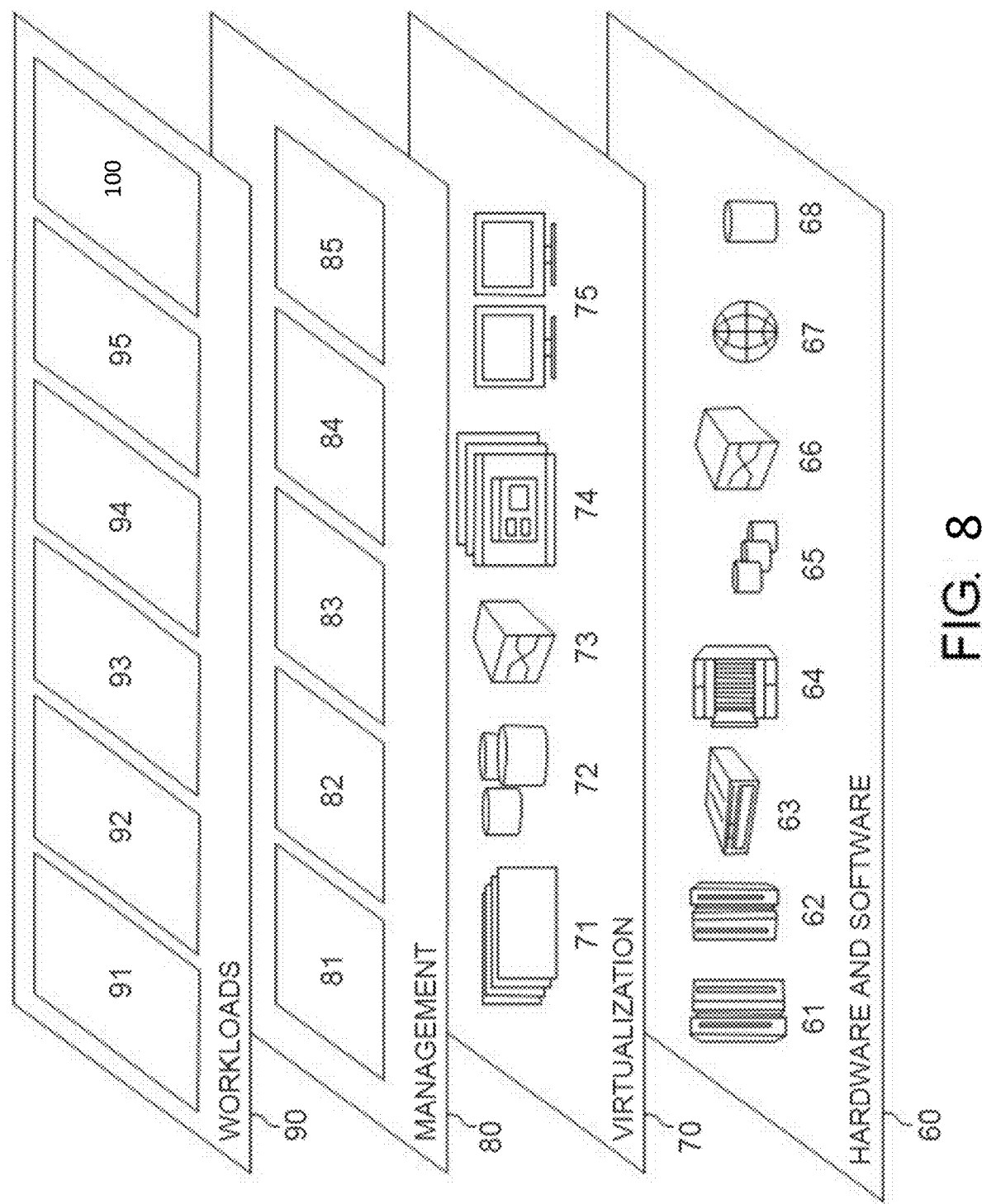
FIG. 8 depicts abstraction model layers according to an embodiment of the present invention.

Referring now to FIG. 8, an exemplary set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and spreadsheet population method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented spreadsheet population method, the method comprising:

associating text with a spreadsheet, the text including candidate data items for populating the spreadsheet;

building a multi-dimensional analogy model where each dimension comprises a unique pair of data items where the data items co-occur within a same context window;

accepting example data items in the spreadsheet where the data items form tuples in a same implicit relationship according to a spatial configuration; and performing an assistance operation on the spreadsheet using the data item tuples retrieved using the analogy model from the example data items.

2. The computer-implemented method of claim 1, wherein context windows are configured for the spreadsheet to include the text context needed to capture at least one implicit relationship between the candidate data items in the given spatial configuration in the spreadsheet.

3. The computer-implemented method of claim 1, wherein the multi-dimensional analogy model comprises a model where vectors include pairs of text units, Latent Semantic Analysis (LSA), Singular Value Decomposition (SVD), and skipgram.

4. The computer-implemented method of claim 1, wherein the accepting is authorized by one of a user and a query against the spreadsheet.

5. The computer-implemented method of claim 1, wherein the assistance operation comprises one of:
  an entry;
  a correction;
  a removal; and
  a scoring.

6. The computer-implemented method of claim 1, wherein the data items comprise one of:
  an individual word;
  a sequence of words;
  an individual token;
  a sequence of tokens;
  an individual named entity,
  a sequence of named entities;
  an individual dictionary word;
  a sequence of dictionary words;
  an individual noun phrase chunk; and
  a sequence of noun phrase chunks.

7. The computer-implemented method of claim 1, wherein the context windows comprise:
  a section of a regular portion of text;
  a paragraph of the regular portion of the text;
  a sentence of the regular portion of the text; and
  a caption of the regular portion of the text.

8. The computer-implemented method of claim 1, wherein the spreadsheet comprises:
  a tabular form;
  an interactive data entry system;
  any electronic document with editable data arranged in a grid of rows and columns with or without calculations;
  a front-end for a relational database;
  a cloud or a web-based form or spreadsheet;
  a desktop or a mobile spreadsheet application; and
  any interactive tabular data entry or editing embedded in another application.

9. The computer-implemented method of claim 1, embodied in a cloud-computing environment.

10. A computer program product for spreadsheet population, the computer program product comprising a computer-readable storage medium having program instructions embodied therewith, the program instructions executable by a computer to cause the computer to perform:

associating text with a spreadsheet, the text including candidate data items for populating the spreadsheet;

building a multi-dimensional analogy model where each dimension comprises a unique pair of data items where the data items co-occur within a same context window;

accepting example data items in the spreadsheet where the data items form tuples in a same implicit relationship according to a spatial configuration; and performing an assistance operation on the spreadsheet using the data item tuples retrieved using the analogy model from the example data items.

11. The computer program product of claim 10, wherein context windows are configured for the spreadsheet to include the text context needed to capture at least one implicit relationship between the candidate data items in the given spatial configuration in the spreadsheet.

12. The computer program product of claim 10, wherein the multi-dimensional analogy model comprises a model where vectors include pairs of text units, Latent Semantic Analysis (LSA), Singular Value Decomposition (SVD), and skipgram.

13. The computer program product of claim 10, wherein the accepting is authorized by one of a user and a query against the spreadsheet.

14. The computer program product of claim 10, wherein the assistance operation comprises one of:
  an entry;
  a correction;
  a removal; and
  a scoring.

15. The computer program product of claim 10, wherein the data items comprise one of:
  an individual word;
  a sequence of words;
  an individual token;
  a sequence of tokens;
  an individual named entity,
  a sequence of named entities;
  an individual dictionary word;
  a sequence of dictionary words;
  an individual noun phrase chunk; and
  a sequence of noun phrase chunks.

16. A spreadsheet population system, the system comprising:
  a processor, and
  a memory, the memory storing instructions to cause the processor to perform:
    associating text with a spreadsheet, the text including candidate data items for populating the spreadsheet;
    building a multi-dimensional analogy model where each dimension comprises a unique pair of data items where the data items co-occur within a same context window;
    accepting example data items in the spreadsheet where the data items form tuples in a same implicit relationship according to a spatial configuration; and
    performing an assistance operation on the spreadsheet using the data item tuples retrieved using the analogy model from the example data items.

17. The system of claim 16, wherein context windows are configured for the spreadsheet to include the text context needed to capture at least one implicit relationship between the candidate data items in the given spatial configuration in the spreadsheet.

18. The system of claim 16, wherein the multi-dimensional analogy model comprises a model where vectors include pairs of text units, Latent Semantic Analysis (LSA), Singular Value Decomposition (SVD), and skipgram.

19. The system of claim 16, wherein the accepting is authorized by one of a user and a query against the spreadsheet.

20. The system of claim 16, embodied in a cloud-computing environment.

\* \* \* \* \*